Figure 1:
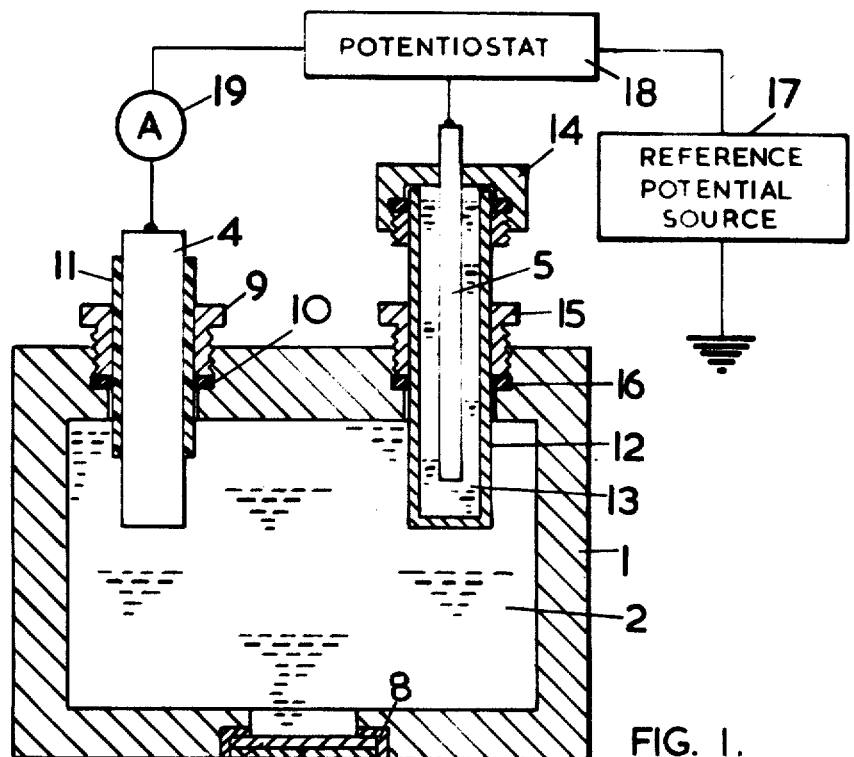

United States Patent [19] [11] 3,882,012
Dickinson et al. [45] May 6, 1975

[54] OXYGEN SENSORS

[75] Inventors: Thomas Dickinson, Newcastle-upon-Tyne; Lynden John Greenley, Tonbridge, both of England

[73] Assignee: The Secretary of State for Defence in Her Britannic Majesty's Government of the United Kingdom and Northern Ireland, London, England

[22] Filed: Nov. 26, 1973

[21] Appl. No.: 419,048

[30] Foreign Application Priority Data
Nov. 24, 1972 United Kingdom............... 54329/72

[52] U.S. Cl. ............... 204/195 P; 204/1 T; 136/153
[51] Int. Cl. ........................................... G01n 27/46
[58] Field of Search ........... 136/86 F, 153; 204/1 T, 204/195 P, 195 S

[56] References Cited
UNITED STATES PATENTS
3,404,036 10/1968 Kummer et al..................... 136/153
3,689,394 9/1972 Davies............................ 204/195 P Primary Examiner—T. Tung
Attorney, Agent, or Firm—Stevens, Davis, Miller & Mosher

[57] ABSTRACT

In oxygen sensors of the type wherein a barrier separates the cathode from the environment, the anode or reference electrode is either a soluble product electrode (for example silver) immersed in a salt electrolyte or a reactive electrode such as a molten alkali metal, separated from the molten salt electrolyte of the sensor by a membrane of ionically conducting solid through which cations of the salt electrolyte or of the reactive electrode can be transported.

26 Claims, 3 Drawing Figures

OXYGEN SENSORS

The present invention relates to improvements in oxygen sensors of the type disclosed and claimed in co-pending UK patent application No. 40078/69.

Hereinafter references to an oxygen sensor of the type described refer to an oxygen sensor including an electrochemical cell having a gas diffusion electrode as cathode, a salt electrolyte capable of being molten at the temperature of operation of the sensor, and a counter electrode as anode; the gas diffusion electrode including a porous metal layer and another layer substantially non-porous to the electrolyte but porous to oxygen, interposed between the porous metal layer and the environment of the sensor.

In UK application No. 40078/69 counter electrodes which are metal/ metal oxide systems are disclosed, in which the metal is any metal stable in contact with the molten salt electrolyte and capable of forming an oxide substantially insoluble in said molten salt electrolyte. Suitable metals disclosed include tin, zinc and alloys thereof.

It has been found that when certain metals such as zinc are used as the counter electrode in an oxygen sensor of the type described, the original output of the sensor is not readily recovered after a period of time during which there has been no oxygen in the environment of the sensor and consequently no current has been drawn from the sensor. This loss of response appears to be due to passivation of the anode of the oxygen sensor whereby it becomes covered with a highly protective oxide film whilst in a quiescent state.

In accordance with the present invention an oxygen sensor of the type described includes an electrode comprising either a soluble product electrode (as hereinafter defined) immersed in a salt electrolyte or a reactive electrode (as hereinafter defined), separated from the salt electrolyte of the electrochemical cell by a membrane of ionically conducting solid through which cations of the salt electrolyte or the reactive electrode respectively can be transported and where the said electrode is used either as the anode of the oxygen sensor or as a reference electrode and means by which the gas diffusion electrode can be maintained at a constant potential with respect to the said reference electrode if present.

In the present specification the term 'reactive electrode' refers to an electrode composed of a metal which is molten at the temperature of operation of the sensor and which on standing in a molten electrolyte similar to that of the molten salt electrolyte of the oxygen sensor has a low tendency to passivate but which unless protected would react with the electrolyte to form a gas.

The term 'soluble product electrode' in the present specification refers to an electrode composed of a metal which has a low tendency to passivate on standing in a molten electrolyte similar to that of the molten salt electrolyte of the sensor and which is substantially chemically unreactive to the said electrolyte. When a soluble product electrode is used as the anode of an electrochemical cell incorporating a molten electrolyte similar to that of the molten salt electrolyte of the oxygen sensor, the soluble product electrode will, on the passage of current through the cell, produce soluble anodic dissolution products which may be subsequently deposited on the cathode unless steps are taken to prevent this.

In one aspect of the present invention the said electrode comprises a reactive electrode composed of a metal or an alloy containing a metal selected from the alkali metals or alkaline earth metals and wherein the salt electrolyte of the electrochemical cell is substantially a mixture of alkali metal nitrates. Preferably the alloy is an amalgam. Sodium amalgam is particularly effective. Alternatively the reactive electrode is sodium, potassium or an alloy of sodium and potassium.

In an alternative aspect of the present invention the said electrode includes a soluble product electrode composed of a metal or alloy containing a metal selected from the group silver, indium, bismuth or copper and wherein the salt electrolyte of the soluble product electrode and the salt electrolyte of the electrochemical cell are substantially mixtures of alkali metal nitrates. Soluble product electrodes composed of a material selected from the group silver, indium amalgam or an indium bismuth alloy are particularly effective. The use of copper although possible is not recommended because of the large amounts of brown deposits produced when the copper is contacted with the salt electrolyte. Electrodes composed of platinum, tin, tin amalgam and nickel are unsuitable due to severe polarisation on passing a current; that is, the potential of an anode using these materials alters markedly with the magnitude of the current employed. Electrodes composed of cadmium, iron, manganese, lead vanadium and amalgams of cadmium, manganese and lead and zinc magnesium alloys all evolve gas on standing in the molten salt electrolyte and are therefore unsuitable as soluble product electrodes.

Preferably the mixture of alkali metal nitrates is a eutectic mixture. An electrolyte which is useful in an oxygen sensor of the present invention when the sensor is used at a temperature of 150°C is the eutectic of sodium, potassium and lithium nitrates having substantially the composition $NaNO_3$ — 30 moles percent, $KNO_3$ — 53.5 moles percent and $LiNO_3$ — 16.5 moles percent.

Suitable ionically conducting solids for use in oxygen sensors of the present invention include β-aluminas. β-aluminas are sodium aluminates having compositions in the range $Na_2$ 0.5 $Al_2O_3$ to $Na_2$ 0.11 $Al_2O_3$. In some cases partial replacement of the aluminium by magnesium or other elements is necessary to stabilise the structure, β-aluminas in which the sodium ions are partially or completely replaced by other alkali metal or alkaline earth metal ions can also be prepared. Some methods of manufacture of β-aluminas have been described by I. Wynn Jones and L.J. Miles; power sources, 3, 245, (1970).

Ferrites may also be used. A suitable ferrite having the general formula $Na_x$ $K_{2-x}$ $Fe_7$ $O_{11}$, where $x$ has a value between 1 and 0.87 has been described by K.O. Hever, J Electrochem Soc 115, 826 (1968).

When reactive electrodes, i.e., molten alkali metals or alkaline earth metals and alloys such as amalgams are used it is necessary to use a membrane of an ionically conducting solid through which transport can take place by means of the electrode cation. For example when an electrode of molten sodium is used, a solid electrolyte in which ionic transport takes place by means of the sodium ion, such as a β-alumina, should be used. When a soluble product electrode is used an ionically conducting solid through which cations of the salt electrolyte in which the soluble product electrode is immersed should be used, but it is important that the solid should be chosen so that transport of the soluble dissolution products produced is substantially prevented. Since the quantity of soluble dissolution products increases with the passage of current it may be preferable to use a soluble product electrode as a reference electrode in oxygen sensors of the present invention. This has the effect of reducing the passage of current through the soluble product electrode and thus reducing the quantity of soluble dissolution products produced.

In oxygen sensors of the present invention the soluble product electrode immersed in salt electrolyte or reactive electrode is encased in a container of the said ionically conducting solid. Alternatively the soluble product electrode immersed in salt electrolyte or reactive electrode may be encased in a container which is inert with respect to the salt electrolyte, the said container having one aperture filled with an ionically conducting solid in such a way that cation transport can take place between the electrode and the salt electrolyte of the electrochemical cell.

Figure 2:
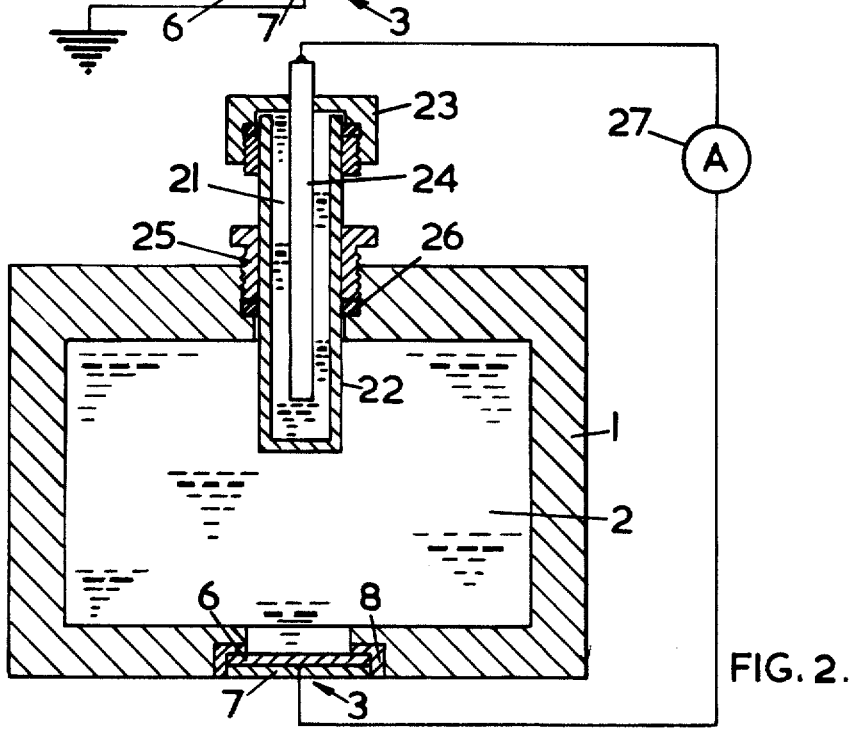
Figure 3:
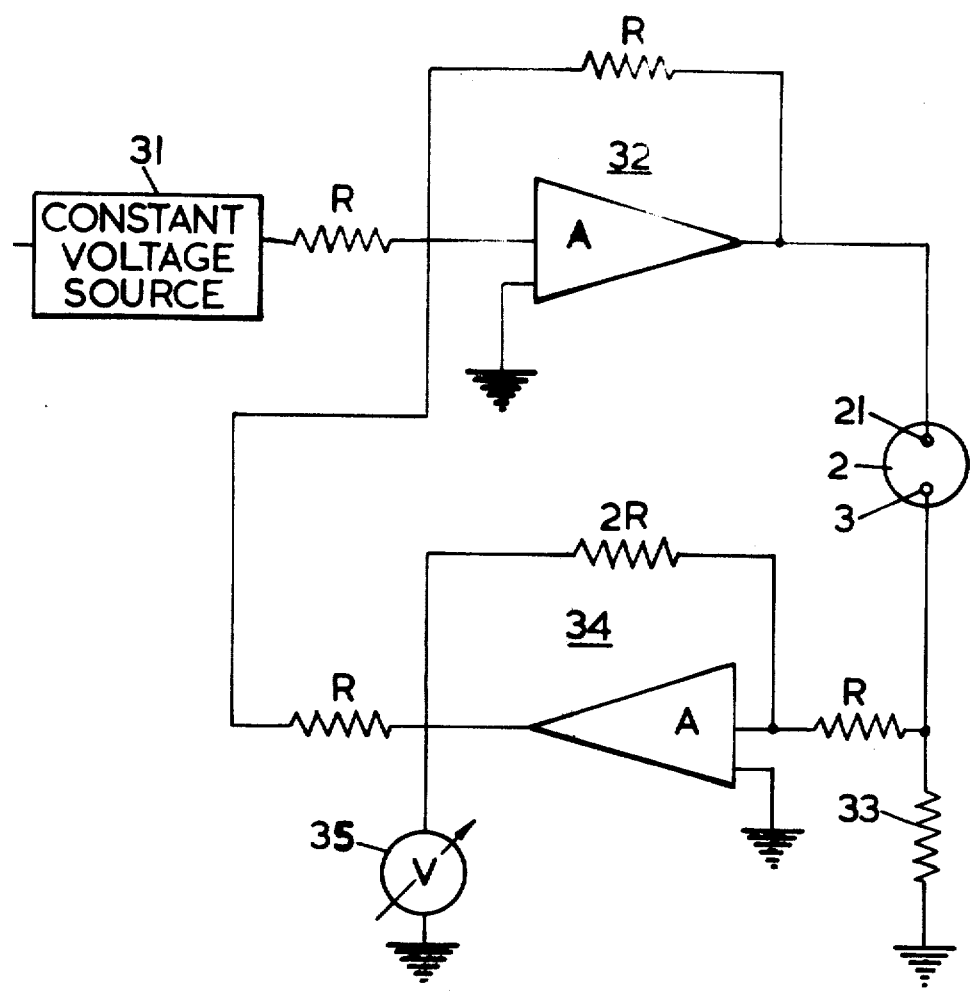

Some embodiments of the invention will now be described by way of example only with reference to the accompanying drawings in which:

FIG. 1 is a schematic cross sectional view of an oxygen sensor in accordance with the invention having a soluble product electrode constituting a separate reference electrode, FIG. 2 is a schematic cross sectional view of an oxygen sensor having a reactive electrode serving as anode and reference electrode combined, and FIG. 3 shows a preferred circuit for use with oxygen sensors in which a reactive electrode serves as both anode and reference electrode.

FIG. 1 shows schematically a soluble product electrode use in an oxygen sensor as a reference electrode. A steel container 1, containing a molten salt electrolyte 2, is closed by a gas diffusion electrode 3 and supports an anode 4 and the soluble product electrode 5. The gas diffusion electrode 3 consists of a sintered silver cathode 6 in contact with the molten salt electrolyte 2, and a gas-permeable polytetrafluoroethylene film 7. The gas diffusion electrode 3 is held in position in the steel container 1 with silver-filled araldite 8. The anode 4 consists of a zinc rod which is supported on the container 1 by means of a screw-threaded retaining member 9 provided with a PTFE or viton O-ring seal 10. The zinc anode 4 is partly immersed in the molten salt electrolyte 2 but is insulated from the container 1 by means of a shrink-fitted PTFE tube 11.

The soluble product electrode, a silver rod 5 serves as a reference electrode for the oxygen sensor, and is encased in a $\beta$-alumina tube 12 containing molten salt electrolyte 13 in which a small amount of silver nitrate $AgNO_3$ has been dissolved. The tube 12 has a screw-fitting closure 14 which supports the silver rod 5. The tube 12 containing the soluble product electrode is held in position in the steel container 1 by means of a screw-threaded retaining member 15 provided with a PTFE or viton O-ring seal 16. The tube 12 is partly immersed in the molten salt electrolyte 2.

The gas diffusion electrode 3 is earthed, and a reference potential source 17, also earthed, provides one input to a potentiostat 18. The reference electrode, that is the silver rod 5 provides the second input to the potentiostat 18. The output of the potentiostat 18 is connected to the anode 4 through an ammeter 19, the reading on which is characteristic of the oxygen content of the sensor enviroment.

The salt electrolyte used in both container 1 and tube 12 was the sodium, potassium and lithium nitrate eutectic consisting of $NaNO_3$ —30 mole percent; $KNO_3$—53.5 mole percent; $LiNO_3$ 016.5 mole percent. The $\beta$-alumina tube 12 also contained about 0.1 M of silver nitrate, $AgNO_3$ dissolved in the nitrate eutectic.

The cell described may be further modified by replacing the $\beta$-alumina tube with an $\alpha$-alumina tube having the end immersed in the salt electrolyte and closed by a $\beta$-alumina disc. A suitable seal between $\alpha$-alumina and $\beta$-alumina may be obtained by using the method described by Weber and Kummer, Intersoc, Energ. Convers. Engng. Conf (1967) 913–6. Alternatively a membrane of any suitable solid electrolyte may be used.

A similar set up to that shown in FIG. 1 may be used for a reactive electrode used as a reference electrode. In this case the reactive electrode, for example molten sodium would be enclosed within the $\beta$-alumina tube 12 and an inert metal contact, of stainless steel for example would be used in order to make connection with the potentiostat 18.

FIG. 2 shows schematically one embodiment of a reactive electrode used in an oxygen sensor as a combined anode and reference electrode.

A steel container 1 containing a salt electrolyte 2 is closed by a gas diffusion electrode 3 and supports an anode 21 which is a reactive electrode. The gas diffusion electrode 3 consists of a sintered silver cathode 6 in contact with the molten salt electrolyte 2, and a gas-permeable polytetrafluoroethylene film 7. The gas diffusion electrode 3 is held in position in the steel container 1 with silver-filled araldite 8.

The reactive electrode, consisting of molten sodium 21, and also serving as a reference electrode, is contained within a $\beta$-alumina tube 22. The tube 22 has a screw-fitting closure 23 which supports a stainless steel contact 24 immersed in the sodium 21. The tube 22 containing the sodium 21 is supported partly immersed in the molten salt electrolyte 2 in the container 1. The tube is held in position in the steel container 1 by means of a screw-threaded retaining member 25 provided with a PTFE or viton 0-ring seal 26. In this embodiment the gas diffusion electrode serves as the cathode and the molten sodium electrode as the anode of the oxygen sensor, and are both connected to an ammeter 27 for the detection and recording of electrical currents which are characteristic of the oxygen content of the environment sampled.

The simple ammeter circuit may of course be replaced by other suitable circuits known to those in the art. One preferred circuit is illustrated in FIG. 3. This circuit provides automatic compensation for the change in the potential drop across the $\beta$-alumina when the current varies. A constant voltage source 31 applies a potential between the reactive electrode 21 and gas diffusion electrode 3 through an adding circuit 32. A feed back voltage is developed across a resistor 33 which has a resistance equal to that of the $\beta$-alumina membrane. This feed-back voltage is dependent on the voltage drop across the $\beta$-alumina tube 22 when current flows, and is doubled and added to the constant voltage through an inverting amplifier circuit 34 so that the potential of the oxygen electrode is held at a constant value. The feed back voltage which is a characteristic of the oxygen content of the environment sampled, is measured at the output of the inverting amplifier circuit by means of a voltmeter 35 which may be calibrated in terms of oxygen content of the environment sampled.

The salt electrolyte used in the embodiment illustrated by FIGS. 2 and 3 was again the sodium, potassium and lithium nitrate eutectic consisting of NaNO$_3$—30 mole percent, KNO$_3$—53.5 mole percent and LiNO$_3$—16.5 mole percent. The cell could be modified by using any reactive electrode in place of molten sodium, and by using any other suitable solid electrolyte membrane.

What we claim is:

1. An oxygen sensor comprising an electrochemical cell having a salt electrolyte which is molten at the temperature of operation of the sensor, a gas diffusion electrode as cathode, the gas diffusion electrode includiing a porous metal layer and a barrier layer substantially non-porous to the electrolyte but porous to oxygen interposed between the porous metal layer and the environment of the sensor, a counter electrode as anode, measuring means to determine the electrical current which flows between the anode and cathode of the electrochemical cell due to oxygen in the environment and wherein the electrochemical cell includes an electrode constituting either the anode or a reference electrode of the electrochemical cell, the said electrode comprising either (A) a soluble product electrode immersed in a salt electrolyte which is molten at the temperature of operation of the sensor or (B) a reactive electrode and the said electrode being separated from the salt electrolyte of the electrochemical cell by a membrane of ionically conducting solid through which cations of the salt electrolyte or cations of the reactive electrode respectively can be transported and provided that when a separate reference electrode is included a means is provided by which a constant potential is maintained between the gas diffusion electrode and the said separate reference electrode.

2. An oxygen sensor as claimed in claim 1 wherein the said electrode constitutes the anode of the electrochemical cell.

3. An oxygen sensor as claimed in claim 2 wherein the anode is a reactive electrode composed of a metal which is molten at the temperature of operation of the sensor and is selected from the group consisting of the alkali metals, the alkaline earth metals, alloys thereof and alloys containing at least one metal thereof and wherein the salt electrolyte of the electrochemical cell is substantially a mixture of alkali metal nitrates.

4. An oxygen sensor as claimed in claim 3 wherein the reactive electrode is an amalgam containing at least one metal selected from the group consisting of the alkali metals and the alkaline earth metals.

5. An oxygen sensor as claimed in claim 4 wherein the amalgam is a sodium amalgam.

6. An oxygen sensor as claimed in claim 3 wherein the reactive electrode is a metal selected from the group consisting of sodium, potassium and an alloy of sodium and potassium.

7. An oxygen sensor as claimed in claim 3 wherein the reactive electrode is a metal selected from the group consisting of sodium, lithium and alloys containing sodium or lithium and the ionically conducting solid is a β-alumina.

8. An oxygen sensor as claimed in claim 7 wherein the salt electrolyte of the electrochemical cell is a mixture of sodium, potassium and lithium nitrates.

9. An oxygen sensor as claimed in claim 8 wherein the mixture of sodium, potassium and lithium nitrates is an eutectic mixture.

10. An oxygen sensor as claimed in claim 9 wherein the eutectic mixture of sodium, potassium and lithium nitrates is the eutectic mixture having the composition NaNO$_3$—30 moles percent, KNO$_3$—53.5 moles percent and LiNO$_3$ 16.5 moles percent.

11. An oxygen sensor as claimed in claim 2 wherein the anode includes a soluble product electrode composed of a metal selected from the group consisting of silver, indium, bismuth, copper and alloys containing at least one metal thereof and wherein the salt electrolyte in which the soluble product is immersed and the salt electrolyte of the electrochemical cell are substantially mixtures of alkali metal nitrates.

12. An oxygen sensor as claimed in claim 11 wherein the soluble product electrode is a metal selected from the group consisting of silver, indium amalgam and an indium bismuth alloy.

13. An oxygen sensor as claimed in claim 1 in which the electrochemical cell includes a reference electrode and wherein the said electrode constitutes the reference electrode.

14. An oxygen sensor as claimed in claim 13 wherein the reference electrode includes a soluble product electrode composed of a metal selected from the group consisting of silver, indium, bismuth, copper, and alloys containing at least one metal thereof and wherein the salt electrolyte in which the soluble product electrode is immersed and the salt electrolyte of the electrochemical cell are substantially mixtures of alkali metal nitrates.

15. An oxygen sensor as claimed in claim 14 wherein the soluble product electrode is a metal selected from the group consisting of silver, indium amalgam and an indium bismuth alloy.

16. An oxygen sensor as claimed in claim 15 wherein the salt electrolyte in which the soluble product electrode is immersed is a mixture of sodium, potassium and lithium nitrates.

17. An oxygen sensor as claimed in claim 16 wherein the ionically conducting solid is a β-alumina.

18. An oxygen sensor as claimed in claim 17 wherein the anode of the electrochemical cell is constructed from a metal which is stable in contact with the molten salt electrolyte of the electrochemical cell and capable of forming an oxide which is substantially unsoluble in the molten salt electrolyte.

19. An oxygen sensor as claimed in claim 18 wherein the anode is a metal selected from the group consisting of tin, zinc and alloys thereof.

20. An oxygen sensor as claimed in claim 19 wherein the mixture of sodium, potassium and lithium nitrates is an eutectic mixture.

21. An oxygen sensor as claimed in claim 20 wherein the eutectic of sodium, potassium and lithium nitrates is the eutectic mixture having the composition NaNO$_3$—30 moles percent, KNO$_3$—53.5 moles percent and LiNO$_3$—16.5 moles percent.

22. An oxygen sensor as claimed in claim 13 wherein the reference electrode is a reactive electrode composed of a metal which is molten at the temperature of operation of the sensor and is selected from the group consisting of alkali metal, the alkaline earth metals, alloys thereof and alloys containing at least one metal thereof and wherein the salt electrolyte of the electrochemical cell is substantially a mixture of alkali metal nitrates.

23. An oxygen sensor as claimed in claim 22 wherein the reactive electrode is an amalgam containing at least one metal selected from the group consisting of the alkali metals and the alkaline earth metals.

24. An oxygen sensor as claimed in claim 23 wherein the amalgam is a sodium amalgam.

25. An oxygen sensor as claimed in claim 22 wherein the reactive electrode is a metal selected from the group consisting of sodium, potassium and an alloy of sodium and potassium.

26. An oxygen sensor as claimed in claim 22 wherein the reactive electrode is a metal selected from the group consisting of sodium, lithium and alloys containing lithium or sodium and the ionically conducting solid is a $\beta$-alumina.

* * * * *